United States Patent
Toyoda et al.

(10) Patent No.: US 10,002,092 B2
(45) Date of Patent: Jun. 19, 2018

(54) ARITHMETIC PROCESSING UNIT, AND METHOD OF CONTROLLING ARITHMETIC PROCESSING UNIT

(71) Applicant: FUJITSU LIMITED, Kawasaki-shi (JP)

(72) Inventors: Yuta Toyoda, Kawasaki (JP); Koji Hosoe, Yamato (JP); Akio Tokoyoda, Fuchu (JP); Masatoshi Aihara, Hiratsuka (JP); Makoto Suga, Edogawa (JP)

(73) Assignee: FUJITSU LIMITED, Kawasaki (JP)

( * ) Notice: Subject to any disclaimer, the term of this patent is extended or adjusted under 35 U.S.C. 154(b) by 298 days.

(21) Appl. No.: 14/457,461

(22) Filed: Aug. 12, 2014

(65) Prior Publication Data

US 2015/0095621 A1 Apr. 2, 2015

(30) Foreign Application Priority Data

Sep. 27, 2013 (JP) .................................. 2013-201878

(51) Int. Cl.
 *G06F 9/30* (2018.01)
 *G06F 13/366* (2006.01)
 *G06F 13/16* (2006.01)

(52) U.S. Cl.
 CPC ........ *G06F 13/366* (2013.01); *G06F 13/1673* (2013.01); *G06F 9/3001* (2013.01)

(58) Field of Classification Search
 CPC .............................. G06F 9/3001; G06F 13/366
 See application file for complete search history.

(56) References Cited

U.S. PATENT DOCUMENTS

| | | | | |
|---|---|---|---|---|
| 6,470,016 B1 * | 10/2002 | Kalkunte | ............ | H04L 12/5693 370/395.41 |
| 7,099,975 B2 * | 8/2006 | Brown | ................ | G06F 13/3625 710/240 |
| 7,752,400 B1 * | 7/2010 | Young | ................. | G06F 13/1605 711/158 |
| 8,799,611 B2 * | 8/2014 | Foster | ................... | G06F 12/023 711/154 |
| 8,943,240 B1 * | 1/2015 | Subramanian | .......... | G06F 13/28 710/26 |
| 2001/0004363 A1 | 6/2001 | Usukura | | |
| 2012/0119786 A1 * | 5/2012 | Shimizu | ............... | H03K 21/023 327/48 |
| 2014/0035642 A1 * | 2/2014 | Venkata | ............... | H03K 5/1534 327/162 |

(Continued)

FOREIGN PATENT DOCUMENTS

| | | |
|---|---|---|
| JP | 1-146445 | 6/1989 |
| JP | 10-271163 | 10/1998 |
| JP | 2001-177575 | 6/2001 |

*Primary Examiner* — Charles Rones
*Assistant Examiner* — Tian-Pong Chang
(74) *Attorney, Agent, or Firm* — Staas & Halsey LLP

(57) ABSTRACT

An arithmetic processing unit including a memory controller configured to make variable-length access requests allowing a plurality of lengths to a memory, the memory controller comprising: a plurality of buffers configured to hold the access requests for each of the lengths of the access requests; and an arbitrator configured to select one of access requests stored in the plurality of buffers in accordance with a number of remaining resources of the memory.

8 Claims, 3 Drawing Sheets

(56) References Cited

U.S. PATENT DOCUMENTS

2015/0006841 A1*  1/2015  Chen .................. G06F 13/4239
                                                  711/167
2015/0006944 A1*  1/2015  Russell ................... G06F 1/08
                                                  713/501

* cited by examiner

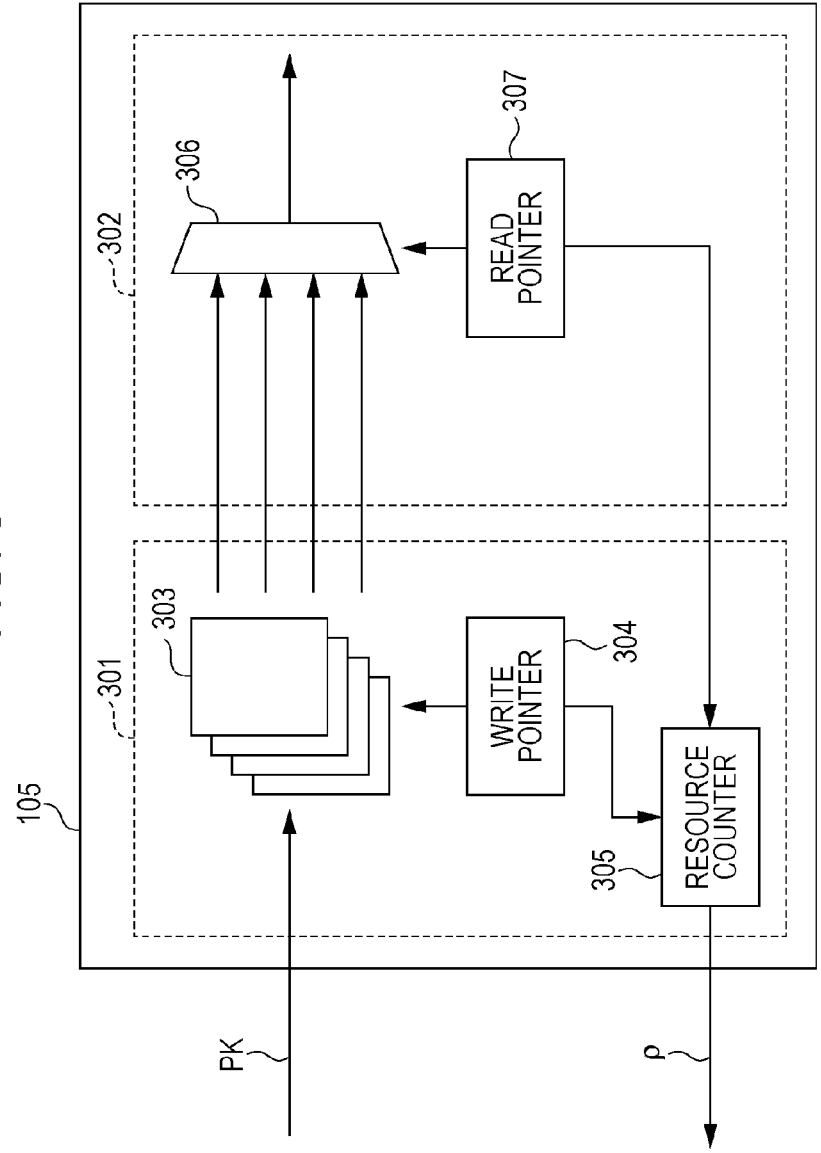

ARITHMETIC PROCESSING UNIT, AND METHOD OF CONTROLLING ARITHMETIC PROCESSING UNIT

CROSS-REFERENCE TO RELATED APPLICATION

This application is based upon and claims the benefit of priority of the prior Japanese Patent Application No. 2013-201878, filed on Sep. 27, 2013, the entire contents of which are incorporated herein by reference.

FIELD

The embodiment discussed herein is related to an arithmetic processing unit, and a method of controlling an arithmetic processing unit.

BACKGROUND

It is known that a packet communication method is provided in which a link is identified from an address field of a packet, an information frame is transmitted and received as confirmation information, and a packet length has statistical deviation (for example, refer to Japanese Laid-open Patent Publication No. 1-146445). A packet communication system by the above-described method is provided with a buffer pool including a plurality of kinds of buffers in accordance with packet lengths, and a data receiver that distributes received packets into the individual buffers of the buffer pool in accordance with the packet length. In the packet communication system, the number of buffers is increased for a packet to be transmitted and received with priority. Also, in the packet communication system, if there is no buffer capable of receiving data at packet reception time, a link is identified from the address field, and notifies that the station is busy only to that link. Also, the packet communication system is provided with a function of notifying that the station is busy to all the links if the total number of empty buffers exceeds a predetermined number, and a flow controller having a function of setting the station ready if the total number of empty buffers exceeds a certain fixed number.

Also, it is known that a packet communication network connection apparatus is provided that mutually connects networks communicating by variable-length packets (for example, refer to Japanese Laid-open Patent Publication No. 10-271163). A determination unit determines a received packet to be a short packet if the packet length is a predetermined value or less, and if not, determination unit determines the received packet to be a long packet. A priority transmission unit transmits short packets with priority over long packets.

Also, a priority control method using a single output queue is known (for example, refer to Japanese Laid-open Patent Publication No. 2001-177575). In the priority control method, the output priority of packets without congestion is improved by exchanging packet orders between packets with congestion or packets that might be congested, and packets without congestion.

A packet length of an access request to a memory is different depending on a type of the access request, and is not fixed. On the other hand, a memory has a limitation as a resource for reception processing, and thus it often happens that an access request is difficult to be processed all the time. In this case, an access request to the memory is processed after waiting for a moment when the resources become free. The remaining number of the memory resources becomes insufficient, and thus transmission of an access request is kept waiting. Accordingly, the throughput of the arithmetic processing unit deteriorates.

SUMMARY

According to an aspect of the invention, an arithmetic processing unit including a memory controller configured to make variable-length access requests allowing a plurality of lengths to a memory, the memory controller comprising: a plurality of buffers configured to hold the access requests for each of the lengths of the access requests; and an arbitrator configured to select one of access requests stored in the plurality of buffers in accordance with a number of remaining resources of the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a configuration of the main memory in FIG. 1.

DESCRIPTION OF EMBODIMENT

Figure 1:
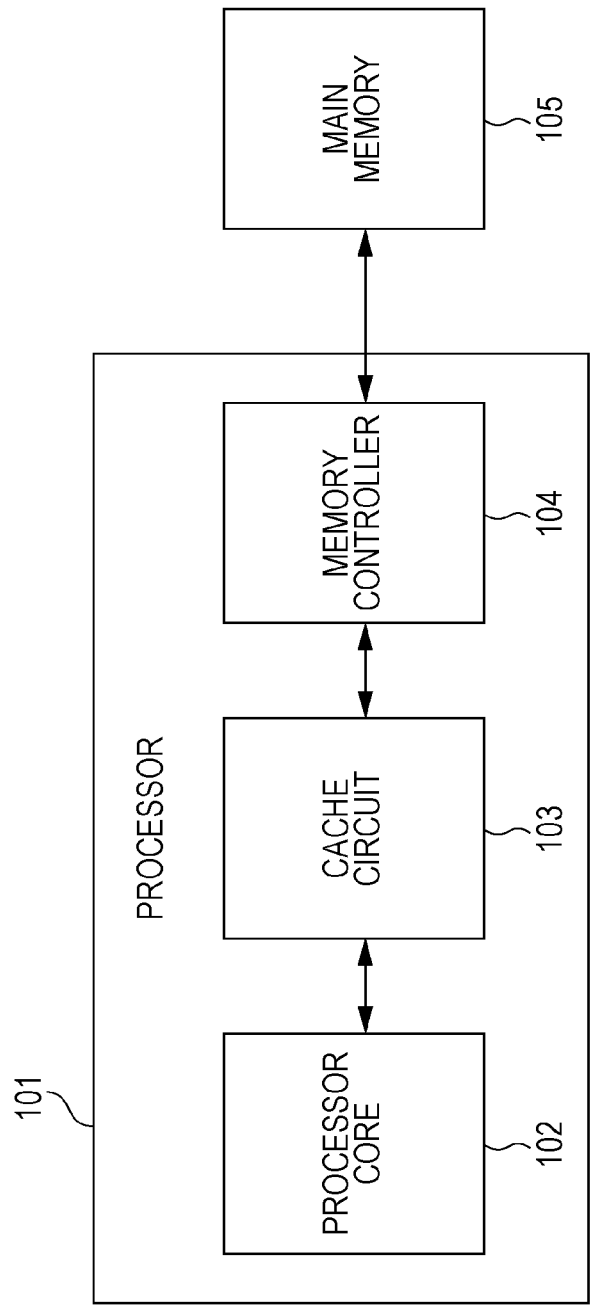
FIG. 1 is a diagram illustrating an example of a configuration of an arithmetic processing system according to the present embodiment.

FIG. 1 is a diagram illustrating an example of a configuration of an arithmetic processing system according to the present embodiment. The arithmetic processing system includes a processor 101 and a main memory 105. The processor 101 is an arithmetic processing unit, and includes a processor core 102, a cache circuit 103, and a memory controller 104. The processor core 102 issues a fetch instruction and a store instruction to the cache circuit 103. The cache circuit 103 includes a cache memory and a cache controller. The cache controller issues a packet of an access request (a read request or a write request) to the memory controller 104. The memory controller 104 is a memory controller, carries out arbitration of access requests, and issues an access request packet to the main memory 105. When the main memory 105 receives input of a read request, the main memory 105 reads data of a specified address, and outputs the read data to the processor core 102 through the memory controller 104 and the cache circuit 103. Also, when the main memory 105 receives input of a write request, the main memory 105 writes write data in the write request into the specified address.

The packet length of an access request issued by the memory controller 104 is different depending on the type of the access request, and is variable. The memory controller 104 issues access requests of a plurality of lengths to the main memory 105. For example, an access request has a different packet length depending on a write request including write data having a different length. Also, an access request has a different packet length depending on whether the access request is a read request or a write request.

Figure 2:
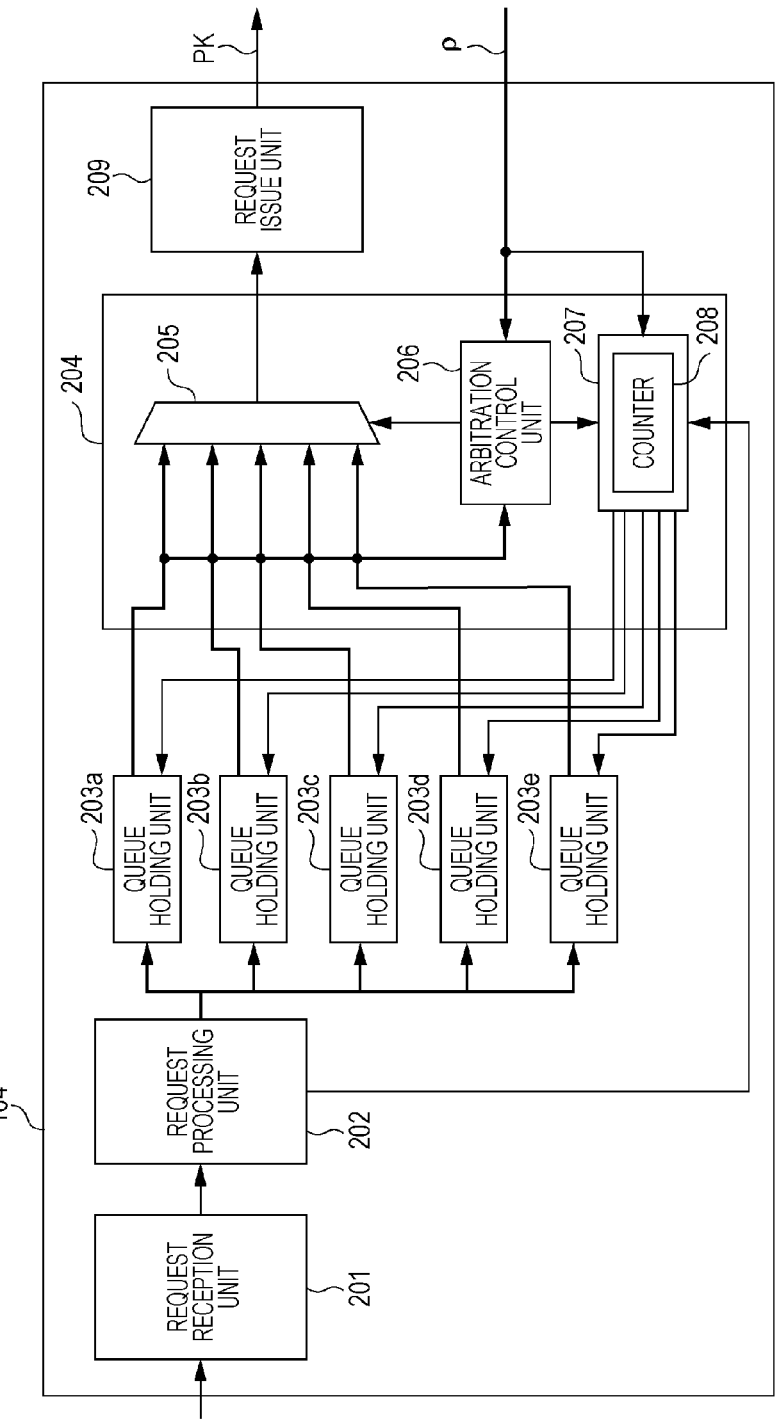
FIG. 2 is a diagram illustrating an example of a configuration of the memory controller in FIG. 1.

FIG. 2 is a diagram illustrating an example of a configuration of the memory controller (host circuit) 104 in FIG. 1. The memory controller 104 includes a request reception unit 201, a request processing unit 202, a plurality of buffers 203a to 203e, a request arbitration unit (so-called an arbitrator) 204, and a request issue unit 209. The request arbitration unit 204 includes a request selection unit 205, an arbitration control unit 206, and a request inhibition control unit 207. The request inhibition control unit 207 includes a counter 208. The memory controller 104 receives an access request packet from the cache circuit 103, performs arbitration on the received packet, and transmits the access request packet PK to the main memory 105. At that time, the memory controller 104 receives the remaining number ρ of resources of the main memory 105 from the main memory 105, and performs arbitration of access requests.

FIG. 3 is a diagram illustrating an example of a configuration of the main memory (remote circuit) 105 in FIG. 1. The main memory 105 has a limit of the resources for reception processing of access request packets PK, and thus waits for the time when the resources become free. After that, the main memory 105 performs reception processing of the access request packets PK. When the remaining number of resources of the main memory 105 is insufficient, transmission of an access request is kept waiting, and thus the throughput of the processor 101 is deteriorated.

The main memory 105 includes a reception packet clock domain 301, and a memory clock domain 302. The reception packet clock domain 301 and the memory clock domain 302 constitute a clock transfer circuit. The reception packet clock domain 301 includes a plurality of flip-flop circuits 303, a write pointer storage unit 304, and a resource counter circuit 305, and operates in synchronism with a first clock signal having the same frequency as that of the reception packet PK. The memory clock domain 302 includes a read circuit 306, a read pointer storage unit 307, and operates in synchronism with a second clock signal, which is an operation clock signal of the main memory 105. The second clock signal is a clock signal having a different frequency as that of the first clock signal. That is to say, the clock frequency of the reception packet PK and the internal clock frequency of the main memory 105 are different. The clock transfer circuit converts a packet PK in synchronism with the first clock signal into a packet in synchronism with the second clock signal.

The plurality of flip-flop circuits 303 constitute a first-in first-out (FIFO) buffer, and holds a received access request packet PK. Depending on the length of the access request packet PK, the number of flip-flop circuits 303 desired for holding the packet is different. The longer the packet PK, the larger number of flip-flop circuits 303 are used. The packet PK is written into a location having an address indicated by a write pointer stored in the write pointer storage unit 304 in the plurality of flip-flop circuits 303 in synchronism with the first clock signal. After the writing, the write pointer of the write pointer storage unit 304 is incremented. The packet PK held in the flip-flop circuits 303 is read to be processed in the main memory 105. Specifically, the read circuit 306 reads data having an address indicated by a read pointer stored in the read pointer storage unit 307 in the plurality of flip-flop circuits 303. After the reading, the read pointer in the read pointer storage unit 307 is incremented.

By the above operation, it is possible for the clock transfer circuit to convert the received data with the frequency of the packet PK into data having the internal clock frequency of the main memory 105. Here, if the first clock signal has a higher frequency than that of the second clock signal, the write speed is faster than the read speed, and thus the flip-flop circuits 303 that are holding data becomes insufficient. Accordingly, the data is overwritten at any point in time. In order to avoid this, the resource counter circuit 305 transmits the difference between the write pointer in the write pointer storage unit 304 and the read pointer in the read pointer storage unit 307 as the remaining number ρ of unused flip-flop circuits (resources) 303 to the memory controller 104. That is to say, the remaining number ρ of resources of the main memory 105 is the number of unused flip-flop circuits 303 out of the plurality of flip-flop circuits 303 in which the clock transfer circuit in the main memory 105 stores the access request packets PK. The main memory 105 may transmit the remaining number ρ of resources in synchronism with transmission and reception of packets PK, or may transmit the remaining number on a regular basis. In this regard, a description has been given of the example in which the resources of the main memory 104 are the flip-flop circuits 303 of the clock transfer circuit. However, the present disclosure is not limited to this.

Next, a description will be given of a method of controlling the memory controller 104 with reference to FIG. 2. The request reception unit 201 receives an access request packet from the cache circuit 103, and outputs the packet to the request processing unit 202. The request processing unit 202 causes different buffers 203a to 203e to hold input packets for each packet length separately, and outputs the packet reception information for each packet length to the request inhibition control unit 207. The packet lengths of the packets to be held is longer in the order of the buffers 203a, 203b, 203c, 203d, and 203e. In this regard, an example of disposing five buffers 203a to 203e is illustrated. However, the number of buffers is not limited to five.

The buffer 203a holds a packet having a first packet length, which is the longest packet length. In order for the main memory 105 to perform reception processing on a packet having the first packet length, the largest number μ1 of first resources are desired. That is to say, if the remaining number ρ of resources is the number μ1 of first resources or more, it is possible to issue an access request packet having the first packet length, which is held in the buffer 203a, to the main memory 105.

The buffer 203b holds a packet having a second packet length, which is the second longest packet length. In order for the main memory 105 to perform reception processing on a packet having the second packet length, the second largest number μ2 of second resources are desired. That is to say, if the remaining number ρ of resources is the number μ2 of second resources or more, it is possible to issue an access request packet having the second packet length, which is held in the buffer 203b, to the main memory 105.

The buffer 203c holds a packet having a having a third packet length, which is the third longest packet length. In order for the main memory 105 to perform reception processing on a packet having the third packet length, the third largest number μ3 of third resources are desired. That is to say, if the remaining number ρ of resources is the number μ3 of third resources or more, it is possible to issue an access request packet having the third packet length, which is held in the buffer 203c, to the main memory 105.

The buffer 203d holds a packet having a fourth packet length 4, which is the fourth longest packet length. In order for the main memory 105 to perform reception processing on a packet having the fourth packet length, the fourth largest number μ4 of fourth resources are desired. That is to say, if the remaining number ρ of resources is the number μ4 of fourth resources or more, it is possible to issue an access request packet having the fourth packet length, which is held in the buffer 203d, to the main memory 105.

The buffer 203e holds a packet having a fifth packet length, which is the fifth longest packet length. In order for the main memory 105 to perform reception processing on a packet having the fifth packet length, the fifth largest number μ5 of resources are desired. That is to say, if the remaining number ρ of resources is the number μ5 of fifth resources or more, it is possible to issue an access request packet having the fifth packet length, which is held in the buffer 203e, to the main memory 105. By the above, a relationship of μ1>μ2>μ3>μ4>μ5 holds.

The request inhibition control unit 207 calculates the number of receptions λ1 to λ5 per unit time for each packet length based on the packet reception information for each packet length to be input from the request processing unit 202. The number λ1 of receptions is the number of receptions per unit time of the packet having the first packet length held in the buffer 203a. The number λ2 of receptions is the number of receptions per unit time of the packet having the second packet length held in the buffer 203b. The number λ3 of receptions is the number of receptions per unit time of the packet having the third packet length held in the buffer 203c. The number λ4 of receptions is the number of receptions per unit time of the packet having the fourth packet length in the buffer 203d. The number λ5 of receptions is the number of receptions per unit time of the packet having the fifth packet length held in the buffer 203e. In this regard, the numbers λ1 to λ5 of receptions may be set freely by the user using a register, and the like.

Also, the request inhibition control unit 207 calculates the limit numbers L1 to L5 of issues for individual packet lengths. The first limit number L1 of issues is the limit number of issues for packets having the first packet length held in the buffer 203a, and is calculated by the following expression. Here, Ta is a fixed value.

$$L1=(Ta \times \lambda 1)/(\lambda 1+\lambda 2+\lambda 3+\lambda 4+\lambda 5)$$

The second limit number L2 of issues is the limit number of issues for packets having the second packet length held in the buffer 203b, and is calculated by the following expression.

$$L2=(Ta \times \lambda 2)/(\lambda 1+\lambda 2+\lambda 3+\lambda 4+\lambda 5)$$

The third limit number of issues L3 is the limit number of issues for packets having the third packet length held in the buffer 203c, and is calculated by the following expression.

$$L3=(Ta \times \lambda 3)/(\lambda 1+\lambda 2+\lambda 3+\lambda 4+\lambda 5)$$

The fourth limit number L4 of issues is the limit number of issues for packets having the fourth packet length held in the buffer 203d, and is calculated by the following expression.

$$L4=(Ta \times \lambda 4)/(\lambda 1+\lambda 2+\lambda 3+\lambda 4+\lambda 5)$$

The fifth limit number L5 of issues is the limit number of issues for packets having the fifth packet length held in the buffer 203e, and is calculated by the following expression.

$$L5=(Ta \times \lambda 5)/(\lambda 1+\lambda 2+\lambda 3+\lambda 4+\lambda 5)$$

Here, if each of the limit numbers L1 to L5 of issues is less than 1, that number is set to 1.

At initial time, the flip-flop circuits 303 of the main memory 105 are not used, and thus the remaining number ρ of resources becomes the maximum value. In this case, since ρ≥μ1, the arbitration control unit 206 outputs a selection signal of the oldest access request packet among the packets in the forefront of the individual buffers 203a to 203e to the request selection unit 205 based on time information in the headers of the packets output by the buffers 203a to 203e, and outputs request issue information to the request inhibition control unit 207. The request selection unit 205 selects the oldest access request packet among the packets in the forefront of the individual buffers 203a to 203e based on the selection signal, and outputs the packet to the request issue unit 209. The request issue unit 209 issues the selected access request packet PK to the main memory 105. The selected packet is deleted from the corresponding buffer, and the above-described processing is repeated for the next packet.

Next, when ρ<μ1, the counter 208 starts counting the number of issues C1 to C5 for each packet length based on the request issue information input from the arbitration control unit 206. The first number C1 of issues is the number of access request packets of the buffer 203a, issued by the request selection unit 205 and the request issue unit 209. The second number C2 of issues is the number of access request packets of the buffer 203b, issued by the request selection unit 205 and the request issue unit 209. The third number C3 of issues is the number of access request packets of the buffer 203c, issued by the request selection unit 205 and the request issue unit 209. The fourth number C4 of issues is the number of access request packets of the buffer 203d, issued by the request selection unit 205 and the request issue unit 209. The fifth number C5 of issues is the number of access request packets of the buffer 203e, issued by the request selection unit 205 and the request issue unit 209.

If the first number C1 of issues becomes larger than the first limit number L1, the request inhibition control unit 207 outputs an issue inhibition signal to the buffer 203a. When the issue inhibition signal is input, the buffer 203a inhibits issuing the internal access request packets.

Also, if the second number C2 of issues becomes larger than the second limit number L2, the request inhibition control unit 207 outputs an issue inhibition signal to the buffer 203b. When the issue inhibition signal is input, the buffer 203b inhibits issuing the internal access request packets.

Also, if the third number C3 of issues becomes larger than the third limit number L3, the request inhibition control unit 207 outputs an issue inhibition signal to the buffer 203c. When the issue inhibition signal is input, the buffer 203c inhibits issuing the internal access request packets.

Also, if the fourth number C4 of issues becomes larger than the fourth limit number L4, the request inhibition control unit 207 outputs an issue inhibition signal to the buffer 203d. When the issue inhibition signal is input, the buffer 203d inhibits issuing the internal access request packets.

Also, if the fifth number C5 of issues becomes larger than the fifth limit number L5, the request inhibition control unit 207 outputs an issue inhibition signal to the buffer 203e. When the issue inhibition signal is input, the buffer 203e inhibits issuing the internal access request packets.

When ρ≥μ1, the counter 208 resets the numbers C1 to C5 of issues to "0", respectively.

If ρ<μ1, the arbitration control unit 206 outputs a selection signal of the oldest access request packet among the buffers 203a to 203e, from which an issue is not inhibited, and having the numbers μ1 to μ5 of resources, which are not larger than ρ, to the request selection unit 205, and outputs the request issue information to the request inhibition control unit 207. The request selection unit 205 selects the above-described oldest access request packet based on the selection signal, and outputs the access request packet to the request issue unit 209. The request issue unit 209 issues the selected access request packet PK to the main memory 105. The selected packet is deleted from the buffer, and the above-described processing is repeated on the next packet. As described above, if the numbers C1 to C5 of issues become the corresponding limit numbers L1 to L5, it is possible to average the number of issues of the packets having individual packet lengths by outputting the individual issue inhibition signals.

In this regard, if there is no access request packet in all the buffers 203a to 203e, no access request packet is issued. By this waiting time, a free resource in the main memory 105 occurs, and the remaining number ρ of resources is gradually increasing.

Also, if no packet is selected for each packet length for a certain time period, it is possible for the request inhibition control unit 207 to increase the priority. In this case, the arbitration control unit 206 selects with priority one of the buffers 203a to 203e to which a packet that has not been selected for the certain time period, and that has the packet length whose priority has been increased. Also, if the arbitration control unit 206 is not possible to select a packet in that one of the buffers 203a to 203e because of the remaining number ρ of resources, the arbitration control unit 206 inhibit the issue of a packet until the remaining number ρ of resources becomes equal to or more than the numbers $\mu 1$ to $\mu 5$ of the resources.

It is possible for the user to freely set the above-described fixed value Ta by a register, or the like. If the fixed value Ta is high, free time for issuing an access request packet becomes the shortest, and the throughput becomes the maximum. However, there is a possibility that an access request packet that has not been issued for a long time might remain, and thus the maximum latency becomes large. On the other hand, if the fixed value Ta is small, all the access request packets in the buffers 203a to 203e are tried to be issued in a short period. Accordingly, although the maximum latency becomes small, waiting time for issuing an access request packet becomes long, and thus the throughput becomes low.

As described above, the plurality of buffers 203a to 203e hold access request packets for each length of the access request packets, respectively. The arbitrator 204 selects any one of the access request packets held in the plurality of buffers 203a to 203e in accordance with the remaining number ρ of resources of the main memory 105, and issues the packet to the main memory 105.

The main memory 105 uses more resources as the length of the access request packet PK becomes longer. The arbitrator 204 selects an access request packet having a length that uses the number of resources, which is equal to or less than the remaining number ρ of resources of the main memory 105, and issues the packet to the main memory 105.

The counter 208 counts the numbers C1 to C5 of issues for each length of the access request packets. The arbitrator 204 selects any one of the access request packets held in the plurality of buffers 203a to 203e in accordance with the numbers C1 to C5 of issues for each length of the access request packets, and issues the packet to the main memory 105.

Supposing that the memory controller 104 issues packets in the order of reception of access request packets evenly, issuing packets is waited because of a resource shortage of the main memory 105. This results in low throughput. By the present embodiment, in the case of a resource shortage of the main memory 105, a succeeding access request packet capable of being issued is issued in advance, and thus it is possible to totally improve the throughput.

In this regard, all of the above-described embodiment is only an example for carrying out the present disclosure, and the technical scope of the present disclosure is not to be interpreted in a limited manner by these. That is to say, it is possible to carry out the present disclosure in various forms without departing from the spirit and scope, or the major features of the disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An arithmetic processing unit having improved throughput by processing variable-length access requests taking into account available resources, and required resources and issuance numbers corresponding to lengths of the access requests, comprising:
   a memory including a resource counter; and
   a memory controller configured to issue the variable-length access requests, allowing a plurality of lengths, to the memory, the memory controller including
      a plurality of buffers configured to hold the access requests, each buffer holding a different length of access request; and
      an arbitrator configured to select one of the access requests stored in the buffers based on a value of the resource counter which indicates a remaining number of resources in the buffers based on received variable-length access requests that are received from the memory controller and extracted variable-length access requests that are read out from the received variable-length access requests.

2. The arithmetic processing unit according to claim 1, wherein the variable-length access requests are write requests including write data having a plurality of lengths.

3. The arithmetic processing unit according to claim 1, wherein the access requests include at least one read request and at least one write request.

4. The arithmetic processing unit according to claim 1, wherein the value of the resource counter is the number of unused flip-flop circuits out of a plurality of flip-flop circuits configured to store the access requests in a clock transfer circuit in the memory.

5. The arithmetic processing unit according to claim 1,
   wherein as access requests become longer, more resources are used by the memory, and
   wherein the arbitrator is configured to select an access request having a length that uses resources not larger than the value of the resource counter.

6. The arithmetic processing unit according to claim 1, wherein the arbitrator has a counter configured to count a number of issues for each length of the access requests and the arbitrator is configured to select any one of the access requests held in the buffers, in accordance with a number of issues for each length of the access requests, and to issue the access requests to the memory.

7. A method of controlling an arithmetic processing unit having improved throughput by processing variable-length access requests taking into account available resources, and required resources and issuance numbers corresponding to lengths of the access requests, the arithmetic processing unit including a memory and a memory controller configured to issue the access requests, having a plurality of lengths, to the memory that has a resource counter for indicating a remaining number of resources in the buffers based on received variable-length access requests that are received from the memory controller and extracted variable-length access requests that are read out from the received variable-length access requests, the method comprising:
- holding the access requests in a plurality of buffers by the memory controller, each buffer holding a different length of access request;
- selecting, by an arbitrator included in the memory controller, any one of the access requests held in the plurality of buffers based on a value of the resource counter; and
- issuing the one of the access requests to the memory.

8. An arithmetic processing system having improved throughput by processing variable-length access requests taking into account available resources, and required resources and issuance numbers corresponding to lengths of the access requests, comprising:
- a memory including a resource counter;
- a processor coupled to the memory; and
- a memory controller, coupled to the memory, the memory controller configured to send to the memory, the variable-length access requests that allow a plurality of lengths, the resource counter indicating a remaining number of resources in the buffers based on received variable-length access requests that are received from the memory controller and extracted variable-length access requests that are read out from the received variable-length access requests, the memory controller including
  - a plurality of buffers configured to hold the access requests, each buffer holding a different length of access request; and
  - an arbitrator configured to select one of the access requests stored in the buffers based on a value of the resource counter, not merely whether a requested resource is available.

* * * * *